United States Patent [19]

Nishimura et al.

[11] Patent Number: 4,652,061
[45] Date of Patent: Mar. 24, 1987

[54] HYDRAULIC ANTI-SKID APPARATUS FOR AUTOMOTIVE VEHICLES

[75] Inventors: Takumi Nishimura, Chiryu; Hirochika Shibata, Kariya, both of Japan

[73] Assignees: Aisin Seiki Kabushiki Kaisha, Kariya; Toyota Jidosha Kabushiki Kaisha, Toyota, both of Japan

[21] Appl. No.: 765,125

[22] Filed: Aug. 13, 1985

[30] Foreign Application Priority Data

Aug. 13, 1984 [JP] Japan .................. 59-169072

[51] Int. Cl.⁴ .................................... B60T 8/10
[52] U.S. Cl. .................................... 303/116; 303/111
[58] Field of Search ............... 188/181 A; 303/92, 93, 303/111, 113, 116, 117, 119

[56] References Cited

U.S. PATENT DOCUMENTS

| 3,722,960 | 3/1973 | Von Lowis | 303/116 |
| 3,922,021 | 11/1975 | Every | 303/92 |
| 4,453,782 | 6/1984 | Arikawa et al. | 303/116 |

FOREIGN PATENT DOCUMENTS 2024354 1/1980 United Kingdom .

Primary Examiner—Duane A. Reger
Attorney, Agent, or Firm—Oblon, Fisher, Spivak, McClelland & Maier

[57] ABSTRACT

A hydraulic anti-skid apparatus for installation in a vehicle braking system includes a cut-off valve disposed within a braking circuit connecting a master cylinder to a wheel brake cylinder, a piston arranged to be applied at opposite ends thereof with a braking pressure from the master cylinder and a hydraulic power pressure from a power pressure source and being associated with the cut-off valve to open the cut-off valve while the power pressure is applied thereto and to be displaced by the braking pressure when released from the power pressure to close the cut-off valve and subsequently to increase a capacity downstream of the cut-off valve, a first changeover valve arranged to normally apply the power pressure to the piston and to exhaust the power pressure when a road wheel tends to be locked, and a second changeover valve arranged to permit the power pressure applied to the piston through the first changeover valve when the master cylinder is operated and to exhaust the power pressure therethrough when the master cylinder is released from its operation. The second changeover valve is loaded to maintain the pressure acting on the piston at a low level while the master cylinder is inoperative.

4 Claims, 4 Drawing Figures

HYDRAULIC ANTI-SKID APPARATUS FOR AUTOMOTIVE VEHICLES

BACKGROUND OF THE INVENTION

The present invention relates to a hydraulic anti-skid apparatus for installation in a vehicle braking system between a master cylinder and a wheel brake cylinder to prevent the road wheels of the vehicle from locking in braking operation.

As one of such anti-skid apparatuses as described above, there has been proposed an anti-skid apparatus which comprises a reservoir arranged to store an amount of hydraulic fluid, a hydraulic power pressure source connected to the reservoir to produce a hydraulic power pressure higher than a braking pressure applied to a wheel brake cylinder from a master cylinder, an accumulator connected to the pressure source to store the hydraulic power pressure, a cut-off valve disposed within a braking circuit connecting the master cylinder to the wheel brake cylinder, the cut-off valve including a valve seat arranged to permit the fluid communication between the master cylinder and the wheel brake cylinder, a valve element arranged to cooperate with the valve seat to block the fluid communication between the master cylinder and the wheel brake cylinder when moved to a closed position, and a piston arranged to be applied at the opposite ends thereof with the braking pressure from the master cylinder and the hydraulic power pressure from the accumulator and being associated with the valve element to maintain the valve element in an open position while the power pressure is applied thereto and to be displaced by the braking pressure when released from the power pressure to effect movement of the valve element to the closed position and subsequently to increase a capacity downstream of the cut-off valve, and a changeover valve disposed within a power pressure circuit connecting the accumulator to the cut-off valve to normally permit the hydraulic power pressure applied to the piston therethrough and to connect the piston to the reservoir when the road wheels of the vehicle tend to be locked in braking operation. In the above-described anti-skid apparatus, the hydraulic power pressure acting on the piston is exhausted only when the road wheels of the vehicle tend to be locked. This means that the hydraulic power pressure is always applied to the cut-off valve even when the master cylinder is inoperative. This causes a hydraulic heavy load acting on sealing members assembled within the cut-off valve, resulting in a decrease in the life-span of the sealing members.

SUMMARY OF THE INVENTION

It is, therefore, a primary object of the present invention to provide an improved hydraulic anti-skid apparatus capable of decreasing the hydraulic power pressure acting on the piston when the master cylinder is released from its operation and of maintaining the pressure acting on the piston at a low level while the master cylinder is inoperative.

According to the present invention, the primary object is attained by providing a hydraulic anti-skid apparatus wherein a second changeover valve is disposed within the power pressure circuit between the accumulator and the changeover valve to permit the hydraulic power pressure applied to the cut-off valve through the changeover valve only when the master cylinder is operated and to connect the power pressure circuit to the reservoir when the master cylinder is released from its operation, and wherein the second changeover valve is associated with means for maintaining the pressure in the power pressure circuit at a predetermined low level while the master cylinder is inoperative.

BRIEF DESCRIPTION OF THE DRAWINGS

Additional objects, features and advantages of the present invention will become readily apparent from the following detailed description of a preferred embodiment and certain modifications thereof when taken together with the accompanying drawings, in which.

DETAILED DESCRIPTION OF THE PREFERRED EMBODIMENT

Figure 1:
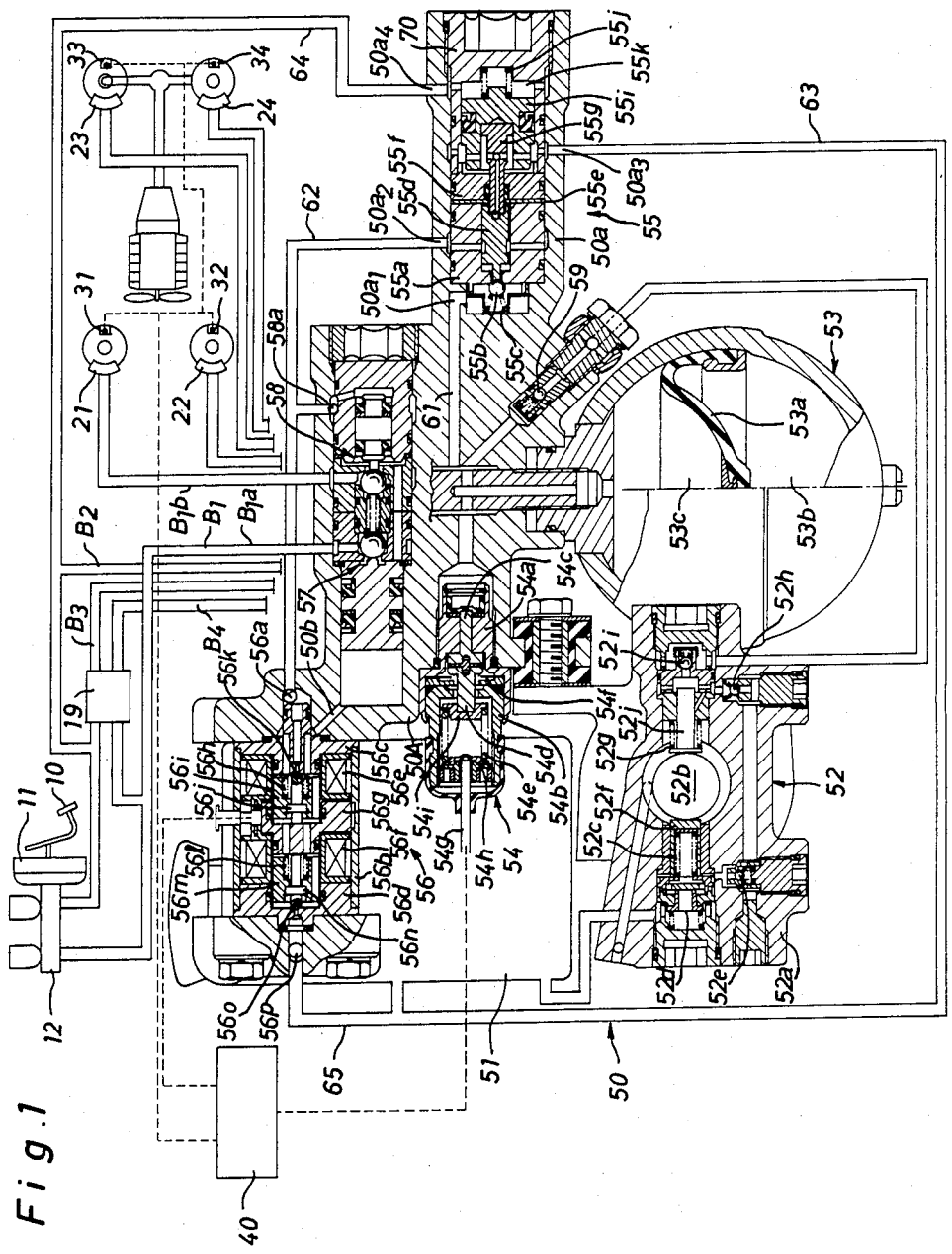
FIG. 1 is a sectional view illustrating the component parts of a hydraulic anti-skid apparatus in accordance with the present invention.

Referring now to the drawings, particularly in FIG. 1, there is schematically illustrated a braking system for automotive vehicles which includes a tandem master cylinder 12 equipped with a booster 11 to be activated by depression of a brake pedal 10. The tandem master cylinder 12 has a front pressure chamber connected to a left-hand front wheel brake cylinder 21 by way of a hydraulic circuit $B_1$ and connected to a right-hand rear wheel brake cylinder 24 by way of a bypass circuit $B_4$ of the hydraulic circuit $B_1$. The tandem master cylinder 12 has a rear pressure chamber connected to a right-hand front wheel brake cylinder 22 by way of a hydraulic circuit $B_2$ and connected to a left-hand rear wheel brake cylinder 23 by way of a bypass circuit $B_3$ of the hydraulic circuit $B_2$. Disposed within the hydraulic circuits $B_3$ and $B_4$ is a well known proportioning valve 19.

In the above-described arrangement of the hydraulic circuits, the braking system includes an anti-skid apparatus 50 for controlling the braking pressure respectively applied to the wheel brake cylinders 21, 22, 23 and 24. The anti-skid apparatus 50 comprises wheel lock sensors 31, 32, 33 and 34 for detecting the rotational speed of the respective road wheels, and a module 40 for producing an electric control signal therefrom in depedence upon each value of electric signals from the sensors. The anti-skid apparatus 50 further comprises a reservoir 51, a high pressure two-stage pump 52, an accumulator 53, a pressure switch 54, a first changeover valve in the form of a solenoid valve 56, a second changeover valve 55, a cut-off valve 57 of the piston type, and a bypass valve 58.

The solenoid valve 56, the cut-off valve 57 and the bypass valve 58 are arranged to control the fluid under pressure in the hydraulic circuit $B_1$. The hydraulic circuits $B_2$, $B_3$ and $B_4$ each are provided with a solenoid valve, a cut-off valve and a bypass valve (not shown) which are substantially the same in construction and operation as the solenoid valve 56, the cut-off valve 57 and the bypass valve 58. The reservoir 51 is arranged to store an amount of hydraulic fluid to be supplied to the accumulator 53. The high pressure two-stage pump 52 is arranged to be driven by an electric motor (not shown) for producing a hydraulic power pressure. The high pressure two-stage pump 52 comprises a pump housing 52a, a cam shaft 52b rotatably carried on the pump housing 52a to be driven by the electric motor, a plunger 52f arranged to be reciprocated by engagement with the cam shaft 52b under load of a spring 52c, and a pair of check valves 52d and 52e arranged to cooperate with the plunger 52f for operating it as a low pressure pump. The two-stage pump 52 further comprises a plunger 52j arranged to be reciprocated by engagement with the cam shaft 52b under load of a spring 52g, and a pair of check valves 52h and 52i arranged to cooperate with the plunger 52j for operating it as a high pressure pump.

The accumulator 53 is of the gas type, the interior of which is subdivided by a diaphragm 53a into a gas pressure chamber 53b and a hydraulic pressure chamber 53c. The hydraulic pressure chamber 53c is connected to the two-stage pump 52 through a check valve 59 to store the hydraulic power pressure therein. The pressure switch 54 is arranged to detect the hydraulic pressure in chamber 53c of the accumulator 53. The pressure switch 54 comprises a body 54a of conductive material threaded into a main body 50A of conductive material for the anti-skid apparatus 50 in a liquid-tight manner, a body 54b of insulation material fixedly coupled within the body 54a, a plunger 54c arranged to be applied with the hydraulic pressure in chamber 53c of the accumulator 53, a movable contact member 54d connected to the plunger 54c through an insulation member, and a fixed contact member 54f arranged to be engaged with the movable contact member 54d. A leading wire 54g is arranged to be grounded through a retainer 54h, a spring 54e, a retainer 54i, the movable contact member 54d, the fixed contact member 54f and the body 54a. When the hydraulic pressure in chamber 53c of the accumulator 53 exceeds a predetermined level, the plunger 54c is displaced against the spring 54e to effect engagement of the movable contact member 54d with the fixed contact member 54f.

When the hydraulic pressure in chamber 53c of the accumulator 53 drops below the predetermined level, the spring 54e acts to disengage the movable contact member 54d from the fixed contact member 54f thereby to turn off the pressure switch 54. In this condition, the module 40 acts to activate a driving circuit of the electric motor. Thus, the high pressure two-stage pump 52 is driven by the electric motor to increase the hydraulic power pressure in chamber 53c of the accumulator 53. When the power pressure in chamber 53c increases up to the predetermined level, the movable contact member 54d is brought into engagement with the fixed contact member 54f to turn on the pressure switch 54, and in turn, the module 40 acts to deactivate the driving circuit for the electric motor upon lapse of a predetermined period of time. Thus, the hydraulic power pressure in chamber 53c of the accumulator 53 is maintained substantially at the predetermined level which corresponds with a maximum braking pressure for causing lock of the road wheels in braking operation on a non-slippery road.

The changeover valve 55 is disposed within a power pressure circuit connecting the accumulator 53 to a port 56a of the solenoid valve 56 and to a port 58a of the bypass valve 58. The changeover valve 55 comprises a valve seat member 55a disposed within a cylinder 50a integral with the main body 50A, a ball valve 55b arranged to be engaged with a seat portion of member 55a, a compression spring 55c arranged to bias the ball valve 55b rightward, a valve spool 55d axially slidable in the valve seat member 55a and being provided at its left end with an axial projection in engagement with the ball valve 55b and at its right end with a ball, a stopper plate 55e fitted to the right end of valve seat member 55a, a holder 55f fitted to the right end surface of stopper plate 55e, a spool 55g axially slidably carried on the holder 55f and being formed at its left end with a seat portion to be engaged with the ball of valve spool 55d, a closure plug 70 threaded into the outer end of cylinder 50a, a piston 55i axially slidably disposed within a bore in closure plug 70, and a compression spring 55j arranged to bias the piston 55i leftward. The cylinder 50a is formed with a port $50a_1$ connected to the accumulator 53 through a passage 61, a port $50a_2$ connected through a power pressure conduit 62 to the port 56a of solenoid valve 56 and the port 58a of bypass valve 58, a port $50a_3$ connected through an exhaust conduit 63 to the reservoir 51, and a port $50a_4$ connected through a conduit 64 to the master cylinder 12. The port $50a_2$ is further connected to respective ports of the solenoid valves and the bypass valves for the hydraulic circuits $B_2$, $B_3$ and $B_4$ by way of a bypass conduit (not shown) in connection to the power pressure conduit 62.

When a chamber 55k in the changeover valve 55 is applied with a hydraulic pressure lower than a predetermined value through the port $50a_4$, the ball valve 55b is maintained in engagement with the seat portion of valve seat member 55a under the load of spring 55c to interrupt the communication between the ports $50a_1$ and $50a_2$, and the left end of spool 55g is in engagement with the ball of valve spool 55d under the load of spring 55j to interrupt the communication between the ports $50a_2$ and $50a_3$. In such a condition, the pressure in conduit 62 is maintained at a predetermined low level defined by the load of spring 55j. When the chamber 55k in the changeover valve 55 is applied with a hydraulic pressure higher than the predetermined value through the port $50a_4$, the piston 55i, spool 55g and valve spool 55d are moved by the hydraulic pressure against the load of spring 55c to disengage the ball valve 55b from the seat portion of member 55a. Thus, the power pressure conduit 62 is applied with the power pressure from the accumulator 53 through the communication passage 61 and the ports $50a_1$ and $50a_2$. When the pressure in chamber 55k drops below the predetermined value, the hydraulic power pressure in conduit 62 acts to move the spool 55g and piston 55i against the load of spring 55j, and in turn, the spool 55g disengages from the ball of valve spool 55d to permit the flow of fluid from the power pressure conduit 62 to the exhaust conduit 63 through radial holes in the valve seat member 55a, axial and radial recesses formed on the outer periphery and right end of the valve spool 55d, axial and radial holes in the spool 55g, and the port $50a_3$. Thus, the pressure in the conduit 62 decreases to be maintained at the predetermined low level. The pressure applied to the chamber 55k is determined to be a relatively low pressure sufficient for effecting the fluid communication between conduits 61 and 62 in braking operation.

The solenoid valve 56 is energized under control of the module 40 to control the hydraulic power pressure applied to the cut-off valve 57 through the power pressure conduit 62. The solenoid valve 56 comprises a cylindrical casing 56b, a pair of axially spaced stationary cores 56c and 56d fixedly coupled with the opposite ends of casing 56b, a pair of axially spaced solenoid windings 56e and 56f wound around a pair of axially spaced bobbins, an annular block 56g interposed between the solenoid windings 56e and 56f, a movable core 56i axially slidably disposed within the bobbin for solenoid winding 56e and being biased leftward by a compression spring 56h to be attracted rightward in energization of the solenoid winding 56e, a valve support element 56j fixedly coupled within the movable core 56i, a ball valve 56k secured to the right end of valve support element 56j, a movable core 56m axially slidably disposed within the bobbin for solenoid winding 56f and being biased leftward by a compression spring 56l to be attracted rightward in energization of the solenoid winding 56f, a valve support element 56n fixedly coupled within the movable core 56m, and a ball valve 56o secured to the left end of valve support element 56n.

When both the solenoid windings 56e, 56f are being deenergized, the ball valve 56k is disengaged from a seat portion of the stationary core 56c under the load of spring 56h, while the ball valve 56o is maintained in engagement with a seat portion of the stationary core 56d under the load of spring 56l. In such a condition, the port 56a of solenoid valve 56 is communicated with a passage 50b in main body 50A through the seat portion of stationary core 56c and blocked from an exhaust port 56p in communication with the reservoir 51 through a passage 65. When both the solenoid windings 56e, 56f are energized, the movable core 56i is attracted rightward against spring 56h to cause engagement of the ball valve 56k with the seat portion of stationary core 56c, while the movable core 56m is attracted rightward against spring 56l to disengage the ball valve 56o from the seat portion of stationary core 56d. Thus, the passage 50b is blocked from the inlet port 56a of solenoid valve 56 and is communicated with the exhaust port 56p through an axial recess in movable core 56i, axial holes in annular block 56g, an axial recess in movable core 56m, and an orifice in stationary core 56d.

Figure 2:
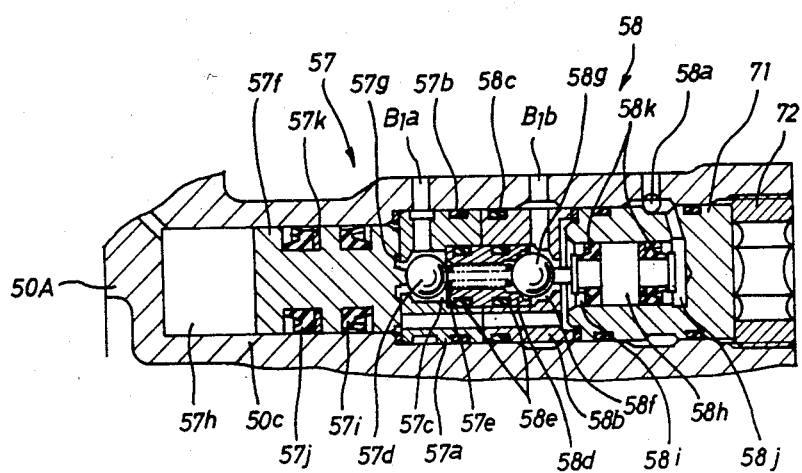
FIG. 2 is an enlarged sectional view of a cut-off valve and a bypass valve shown in FIG. 1.

As shown in FIG. 2, the cut-off valve 57 is associated with the bypass valve 58 coaxially within a single cylinder 50c which is integral with the main body 50A and is closed by a closure plug 71 fastened in place by a nut 72 with a hexagon socket. The cut-off valve 57 comprises a valve seat member 57a fixedly coupled within the cylinder 50c through an annular seal member 57b to form a valve chamber 57c, a ball valve 57d contained within the valve chamber 57c, and a piston 57f axially slidably disposed within the cylinder 50c to form a braking pressure chamber 57g and a power pressure chamber 57h. The piston 57f is provided in its outer circumference with a pair of axially spaced annular cup seal members 57i and 57j, and a back-up ring 57k. The bypass valve 58 comprises a valve seat member 58b fixedly coupled within the cylinder 50c through an annular seal member 58c and fitted to the valve seat member 57a to form a valve chamber 58f, a ball valve 58g contained within the valve chamber 58f, a tubular valve seat member 58d fixedly coupled within the valve seat members 57a and 58b through a pair of axially spaced annular seal members 58e, 58e, a compression coil spring 57e contained within the tubular valve seat member 58d and being engaged at the opposite ends thereof with the ball valves 57d and 58g, and a piston 58h axially slidably disposed within the closure plug 71 through a pair of axially spaced annular seal members 58k, 58k to form a braking pressure chamber 58i and a power pressure chamber 58j. In the assembly of cut-off valve 57 and bypass valve 58, the valve chamber 57c is connected to a first part $B_{1a}$ of the hydraulic circuit $B_1$ in connection to the tandem master cylinder 12, the valve chamber 58f is connected to a second part $B_{1b}$ of the hydraulic circuit $B_1$ in connection to the wheel cylinder 21, and the power pressure chamber 58j is connected to the power pressure conduit 62 through port 58a.

When the power pressure chamber 57h of cut-off valve 57 is applied with the power pressure from accumulator 53 by way of the changeover valve 55, conduit 62, solenoid valve 56 and passage 50b, the piston 57f is urged rightward to disengage the ball valve 57d from a seat portion of member 57a, and the piston 58h is urged leftward by the power pressure applied thereto in chamber 58j to engage the ball valve 58g with a seat portion of the tubular seat member 58d against the compression coil spring 57e. In such a condition, the valve chamber 57c is communicated with the valve chamber 58f through the braking pressure chamber 57g, axial holes in valve seat members 57a and 58b, and the braking pressure chamber 58i to permit the flow of pressurized fluid therethrough between the first and second parts of the hydraulic circuit $B_1$, and the piston 57f is maintained in engagement with the left end of valve seat member 57a to minimize the capacity of braking pressure chamber 57g.

When the solenoid valve 56 is energized to connect the power pressure chamber 57h to the reservoir 51 therethrough, the piston 57f is moved leftward by a braking pressure applied thereto in chamber 57g, and in turn, the ball valve 57d engages the seat portion of member 57a to block the communication between the valve chamber 57c and the braking pressure chamber 57g. Thus, the first part $B_{1a}$ of hydraulic circuit $B_1$ is blocked from the second part $B_{1b}$ of hydraulic circuit $B_1$, and subsequently the capacity of braking pressure chamber 57g is increased by the leftward movement of piston 57f to decrease the braking pressure applied to the wheel brake cylinder 21.

If the power pressure from accumulator 53 drops below the predetermined value due to damage of the pump 52, the conduit 62 or the like, the piston 58h will be applied with the braking pressure through the chamber 57g of cut-off valve 57 prior to engagment of the ball valve 57d with the seat portion of member 57a. Thus, the piston 58h will be moved rightward by the difference in pressure between chambers 58i and 58j so that the ball valve 58g is disengaged from the seat portion of tubular seat member 58d to permit a bypass flow of pressurized fluid across the tubular seat member 58d between the valve chambers 57c and 58f. In such a condition, the ball valve 58g is engaged with a seat portion of member 58b to block a reverse flow of the pressurized fluid from the valve chamber 58f to the braking pressure chamber 58i.

The module 40 is responsive to the electric signals from the wheel lock sensors 31, 32, 33 and 34 to detect the rotation of the respective road wheels in braking operation. When the left-hand front road wheel tends to be locked in the braking operation, the solenoid valve 56 is energized by an electric control signal from the module 40 to exhaust the power pressure from the chamber 57h of cut-off valve 57 into the reservoir 51. Thus, the cut-off valve 57 acts to block the communication between the first and second parts of hydraulic circuit $B_1$ so as to decrease the braking pressure in the wheel brake cylinder 21. When the road wheel is released from the tendency to be locked, the solenoid valve 56 is deenergized under control of the module 40 such that the chamber 57h of cut-off valve 57 is applied with the hydraulic power pressure from the conduit 62 to permit the flow of pressurized fluid between the first and second parts of hydraulic circuit B₁ thereby to increase the braking pressure in the wheel brake cylinder 21. Subsequently, the solenoid valve 56 is alternatively energized and deenergized under control of the module 40 to control the braking pressure in the wheel brake cylinder 21 so as to prevent the road wheel from locking during braking.

In such braking operation as described above, the changeover valve 55 acts to connect the power pressure conduit 62 to the accumulator 53 through the passage 61 when applied with the braking pressure from master cylinder 12 in depression of the brake pedal 10. When the braking pressure drops below the predetermined value in response to release of the brake pedal 10, the changeover valve 55 acts to disconnect the power pressure conduit 62 from the accumulator 53 and connect it to the reservoir 51 through the exhaust conduit 63. Thus, the pressure in chamber 57h of cut-off valve 57 and in chamber 58j in bypass valve 58 decreases to be maintained at the predetermined low level while the brake pedal 10 is released. As a result, it is able to decrease the hydraulic load acting on all the sealing members in the assembly of cut-off valve 57 and bypass valve 58 so as to enhance the durability of them. Furthermore, the compression spring 55j in changeover valve 55 acts to maintain the pressure in conduit 62 at the predetermined low level while the brake pedal 10 is released. Thus, the piston 57f in cut-off valve 57 is urged rightward by the low level pressure in chamber 57h, and the piston 58h in bypass valve 58 is urged leftward by the low level pressure in chamber 58j. This means that when the conduit 62 is applied with the power pressure in response to operation of the changeover valve 55 caused by depression of the brake pedal 10, the cut-off valve 57 and the bypass valve 58 are conditioned to control the braking pressure without causing any shocks and noises. This also results in a decrease in consumption of the power pressure stored in accumulator 53. It is further noted that while the brake pedal 10 is released, the compression spring 55j acts to maintain the piston 55i, spool 55g, valve spool 55d and ball valve 55b in their initial positions. This is effective to reduce the quantity of fluid to be supplied into the chamber 55k of changeover valve 55 in depression of the brake pedal 10.

Figure 3:
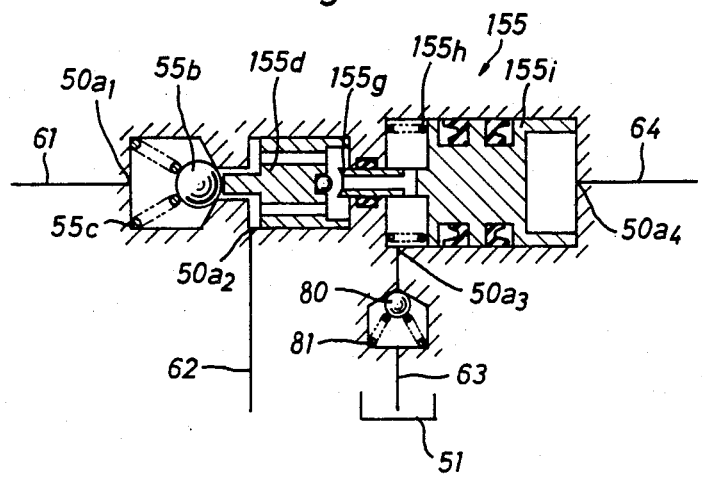
FIG. 3 is a sectional view of a modification of a changeover valve shown in FIG. 1.

In FIG. 3 there is illustrated a modification of the changeover valve 55, wherein a ball valve 80 is disposed within the exhaust conduit 63 and loaded by a spring 81 to maintain the pressure in the power pressure conduit 62 at the predetermined low level while the brake pedal 10 is released. In the modification, the valve spool 55d of changeover valve 55 is replaced with a valve spool 155d, and the spool 55g and piston 55i of changeover valve 55 are replaced with a piston 155i which is loaded rightward by a compression spring 155h. The other component parts and portions are substantially the same as those in the changeover valve 55 and indicated by the corresponding reference numerals. In operation of the modified changeover valve 155, the ball valve 55b is maintained in engagement with a seat portion in the cylinder 50a during release of the brake pedal to block the communication between the passage 61 and the conduit 62, and the ball valve 80 closes under the load of spring 81 to maintain the pressure in conduit 62 at the predetermined low level. When the piston 155i is applied with a braking pressure through port 50a₄ in depression of the brake pedal 10, it is moved leftward against the spring 155h to engage at its left end seat portion 155g with a ball integral with the valve spool 155d, and in turn, the valve spool 155d is urged leftward to open the ball valve 55b. Thus, the passage 61 is connected to the conduit 62 to apply the power pressure from accumulator 53 toward the cut-off valve 57 and the bypass valve 58. When the brake pedal 10 is released, the piston 155i is moved rightward by the compression spring 155h such that the ball valve 55b closes to block the communication between the passage 61 and the conduit 62 and that the ball valve 80 is opened to permit the flow of fluid from the conduit 62 into the conduit 63 through the seat portion 155g of piston 155i.

Figure 4:
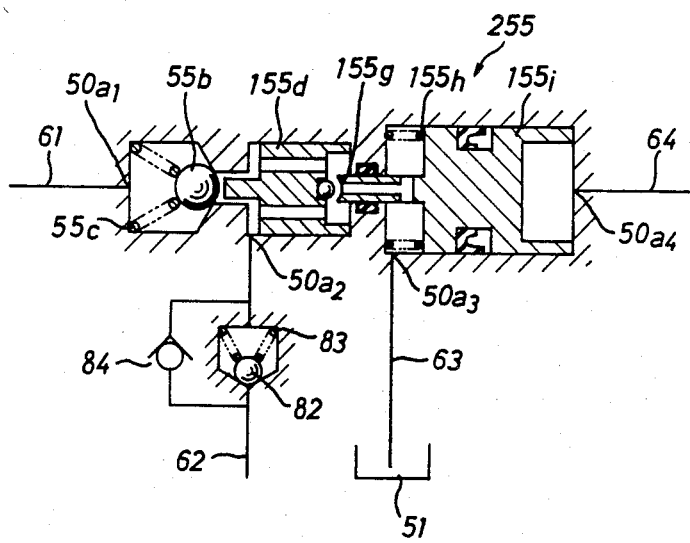
FIG. 4 is a sectional view of another modification of the changeover valve shown in FIG. 1.

In FIG. 4 there is illustrated another modification of the changeover valve 55, wherein a ball valve 82 is disposed within the conduit 62 and loaded by a spring 83 toward the cut-off valve 57 to maintain the pressure in conduit 62 at the predetermined low level during release of the brake pedal 10. In this modified changeover valve 255, a check valve 84 is connected in parallel with the ball valve 82 to permit the flow of fluid passing through the conduit 62 toward the cut-off valve 57 and the bypass valve 58. The other component parts are substantially the same as those in the modified changeover valve 155.

In such modifcations as described above, the changeover valve 155 or 255 may be replaced with an electrically operated changeover valve with three ports to be energized in response to depression of the brake pedal and to be deenergized in response to release of the brake pedal. Furthermore, the present invention may be adapted to an anti-skid apparatus for independently controlling the braking pressures applied to both the front wheel brake cylinders and to both the rear wheel brake cylinders.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A hydraulic anti-skid apparatus for installation in a vehicle braking system between a master cylinder and a wheel brake cylinder, comprising:

a reservoir arranged to store an amount of hydraulic fluid;

a hydraulic power pressure source connected to said reservoir to produce a hydraulic power pressure higher than a braking pressure applied to said wheel brake cylinder from said master cylinder;

an accumulator connected to said pressure source to store the hydraulic power pressure;

a cut-off valve disposed within a braking circuit connecting said master cylinder to said wheel brake cylinder, said cut-off valve including a valve seat arranged to permit the fluid communication between said master cyinder and said wheel brake cylinder, a valve element arranged to cooperate with said valve seat to block the fluid communication between said master cylinder and said wheel brake cylinder when moved to a closed position, and a piston arranged to be applied at one end thereof with the braking pressure from said master cylinder and at the other end thereof with the hydraulic power pressure from said accumulator and being associated with said valve element to maintain said valve element in an open position while the hydraulic power pressure is applied thereto and to be displaced by the braking pressure when released from the hydraulic power pressure to effect movement of said valve element to the closed position and subsequently to increase a capacity downstream of said cut-off valve; and a first changeover valve disposed within a power pressure circuit connecting said accumulator to said cut-off valve to normally permit the hydraulic power pressure applied to said piston therethrough and to connect said piston to said reservoir when a road wheel tends to be locked in braking operation; wherein a second changeover valve is disposed within said power pressure circuit between said accumulator and said first changeover valve to permit the hydraulic power pressure applied to said cut-off valve through said first changeover valve only when said master cylinder is operated and to connect said power pressure circuit to said reservoir when said master cylinder is released from its operation, and wherein said second changeover valve is associated with means for maintaining the pressure in said power pressure circuit at a predetermined low level while said master cylinder is inoperative.

2. A hydraulic anti-skid apparatus as claimed in claim 1, wherein said second changeover valve comprises a first valve seat arranged within said power pressure circuit to permit the fluid communication between said accumulator and said first changeover valve, a second valve seat arranged to permit the fluid communication between said power pressure circuit and said reservoir, a first valve element arranged to cooperate with said first valve seat to block the fluid communication between said accumulator and said first changeover valve when moved to a closed position, a second valve element arranged to cooperate with said second valve seat to block the fluid communication between said power pressure circuit and said reservoir when moved to a closed position, and a piston arranged to be applied at one end thereof with the braking pressure from said master cylinder and at the other end thereof with the hydraulic power pressure and being associated with said first and second valve elements to effect movement of said first valve element to an open position and movement of said second valve element to the closed position when applied with the braking pressure from said master cylinder and to effect movement of said first valve element to the closed position and movement of said second valve element to an open position when released from the braking pressure, and wherein said means for maintaining the pressure in said power pressure circuit is a spring arranged to bias said piston against the hydraulic power pressure.

3. A hydraulic anti-skid apparatus as claimed in claim 2, wherein said means for maintaining the pressure in said power pressure circuit is a spring loaded check valve disposed within an exhaust circuit in communication with said second valve seat to permit the flow of fluid from said power pressure circuit to said reservoir.

4. A hydraulic anti-skid apparatus as claimed in claim 2, wherein said means for maintaining the pressure in said power pressure circuit is a spring loaded check valve disposed within said power pressure circuit between said second valve seat and said first changeover valve to permit the flow of fluid exhausted from said power pressure circuit to said reservoir therethrough, and wherein a second check valve is connected to said power pressure circuit in parallel with said spring loaded check valve to permit the flow of fluid applied to said cut-off valve through said first changeover valve.

* * * * *